US012781825B2

(12) United States Patent
Schwedler

(10) Patent No.: US 12,781,825 B2
(45) Date of Patent: Nov. 3, 2026

(54) VIBRATION DAMPERS FOR A MOTOR VEHICLE

(71) Applicants: thyssenkrupp Bilstein GmbH, Ennepetal (DE); thyssenkrupp AG, Essen (DE)

(72) Inventor: Lars Schwedler, Arnsberg (DE)

(73) Assignees: thyssenkrupp Bilstein GmbH, Ennepetal (DE); thyssenkrupp AG, Essen (DE)

( * ) Notice: Subject to any disclaimer, the term of this patent is extended or adjusted under 35 U.S.C. 154(b) by 323 days.

(21) Appl. No.: 18/606,635

(22) Filed: Mar. 15, 2024

(65) Prior Publication Data

US 2024/0309928 A1 Sep. 19, 2024

(30) Foreign Application Priority Data

Mar. 15, 2023 (DE) ..................... 10 2023 106 520.3

(51) Int. Cl.
*F16F 9/32* (2006.01)
*F16F 9/58* (2006.01)

(52) U.S. Cl.
CPC .......... *F16F 9/3221* (2013.01); *F16F 9/3214* (2013.01); *F16F 9/3228* (2013.01); *F16F 9/585* (2013.01)

(58) Field of Classification Search
None
See application file for complete search history.

(56) References Cited

U.S. PATENT DOCUMENTS

| | | | | |
|---|---|---|---|---|
| 2001/0025753 | A1 | 10/2001 | Pfundstein et al. | |
| 2002/0104723 | A1 | 8/2002 | Obst | |
| 2011/0101585 | A1 * | 5/2011 | Kamae | F16F 9/3242 267/226 |
| 2015/0090548 | A1 | 4/2015 | Yamanaka | |
| 2017/0159743 | A1 | 6/2017 | Chyla et al. | |

(Continued)

FOREIGN PATENT DOCUMENTS

| | | |
|---|---|---|
| CN | 105370789 A | 3/2016 |
| CN | 110206844 A | 9/2019 |

(Continued)

OTHER PUBLICATIONS

CN-115289170-A: English Machine Translation (Year: 2022).*

*Primary Examiner* — Melanie Torres Williams
(74) *Attorney, Agent, or Firm* — thyssenkrupp North America, LLC

(57) ABSTRACT

A vibration damper for a vehicle includes a damper tube, a working piston and a rebound stop arrangement. The damper tube is filled with hydraulic fluid. The working piston is connected to a piston rod and is arranged such that it can be moved within the damper tube. An interior space of the damper tube is divided by way of the working piston into a first working space and a second working space. The rebound stop arrangement includes an additional piston (30) which is attached to the piston rod and encloses the piston rod concentrically. A sleeve-shaped rebound stop receptacle is attached to the damper tube for receiving the additional piston in the rebound stage. The rebound stop arrangement has a spring element which is arranged at least partially within the rebound stop receptacle. The spring element is fastened to the additional piston.

14 Claims, 4 Drawing Sheets

(56) References Cited

U.S. PATENT DOCUMENTS

| | | | | |
|---|---|---|---|---|
| 2018/0163813 | A1 | 6/2018 | Chyla et al. | |
| 2021/0115998 | A1* | 4/2021 | Meinert .................. | F16F 9/585 |

FOREIGN PATENT DOCUMENTS

| | | | | |
|---|---|---|---|---|
| CN | 115289170 | A * | 11/2022 | ............. B60G 13/08 |
| DE | 10016641 | A1 | 10/2001 | |
| DE | 101 05 101 | C1 | 12/2002 | |
| DE | 102013207130 | | 10/2014 | |
| DE | 102014219431 | | 4/2015 | |
| DE | 102015223581 | | 6/2017 | |
| EP | 3176464 | A1 | 6/2017 | |
| KR | 1316122 | B1 | 10/2013 | |

* cited by examiner

VIBRATION DAMPERS FOR A MOTOR VEHICLE

CROSS REFERENCE TO RELATED APPLICATION

This application is a U.S. Non-Provisional that claims priority to German Patent Application No. DE 10 2023 106 520.3, filed Mar. 15, 2023, and the entire content of which is incorporated herein by reference.

FIELD

The disclosure relates to a vibration damper for a motor vehicle with a rebound stop arrangement.

BACKGROUND

DE 101 05 101 C1 has disclosed a hydraulic vibration damper with a hydraulic rebound stop. A hydraulic rebound stop usually serves for additional damping in the end region of the rebound stage of the vibration damper. To this end, in the case of known vibration dampers, an additional piston dips into a rebound stop space and in this way generates additional, for example progressive, damping in the case of a movement of the piston rod in the rebound direction. The components which interact in the case of the rebound damping usually have to meet very accurate manufacturing tolerances, in order to compensate for transverse forces on the piston rod, for example. The manufacture of these components is therefore usually very expensive.

Thus, a need exists to provide a vibration damper with a rebound stop arrangement; reliable damping is to be realised by way of the rebound stop arrangement, and it is to be possible for the rebound stop arrangement to be produced inexpensively.

BRIEF DESCRIPTION OF THE FIGURES

Further advantageous details, features and details of the disclosure will be explained in more detail in the context of the exemplary embodiments illustrated in the figures, in which.

DETAILED DESCRIPTION

Figure 1:
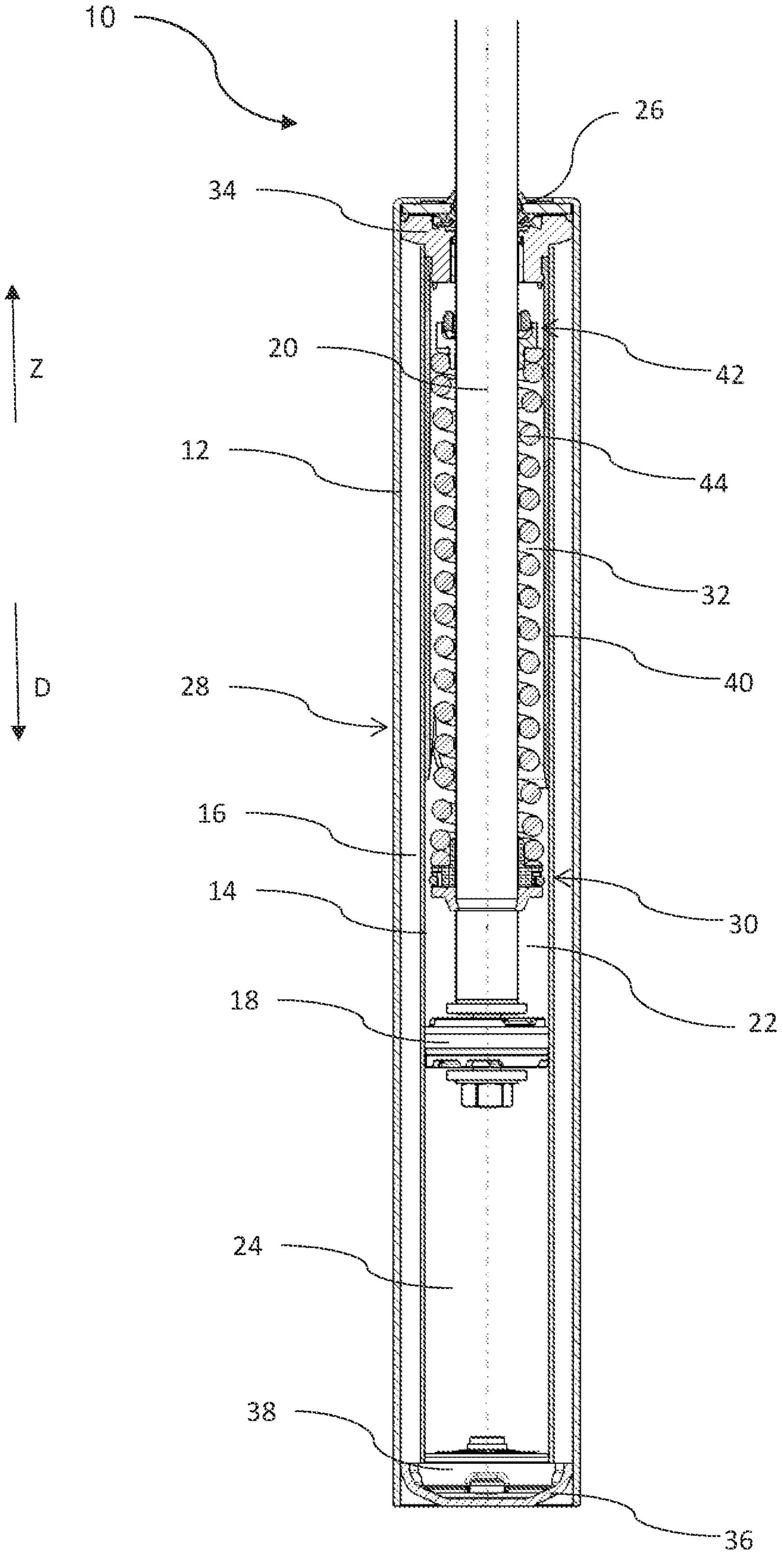
FIG. 1 shows a diagrammatic illustration of a vibration damper in a longitudinal sectional view in accordance with one exemplary embodiment.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood, that the steps of any method claims need not necessarily be performed in the order in which they are recited, unless so required by the context of the claims. In addition, all references to one skilled in the art shall be understood to refer to one having ordinary skill in the art.

The method according to the disclosure serves for operation of a reformer, especially a reformer of a plant for production of ammonia. The reformer is operated at least with a first hydrocarbon mixture and a second hydrocarbon mixture. In particular, the hydrocarbon mixtures are natural gases of different composition or a hydrocarbon mixture with fluctuating composition. The hydrocarbon mixtures, as well as hydrocarbons, may also have other constituents. Typically, these hydrocarbon mixtures additionally include carbon monoxide, carbon dioxide, hydrogen and/or nitrogen. The reformer has a primary reformer; the primary reformer is supplied with a first gas stream. The reformer additionally has a secondary reformer. The secondary reformer is supplied with the semifinished product stream from the primary reformer and an air stream. The first gas stream and the air stream are used to form the quotient of first gas stream divided by the air stream. A threshold value is defined (set, preset). Typically, the threshold value according to the prior art for the quotient of the first gas stream divided by the air stream is defined and compared therewith. If the value goes below the threshold value, the reformer is shut down in order to avoid damage through overheating.

In accordance with a first aspect, a vibration damper for a vehicle comprises a damper tube which is filled with hydraulic fluid, a working piston which is connected to a piston rod and is arranged such that it can be moved to and fro within the damper tube, the interior space of the damper tube being divided by way of the working piston into a first working space on the piston rod side and a second working space which is remote from the piston rod. The vibration damper also comprises, in particular, a closure package which closes off the damper tube on the piston rod side in a fluid-tight manner. Furthermore, the vibration damper comprises a rebound stop arrangement with an additional piston which is attached to the piston rod and encloses the piston rod concentrically, and with a rebound stop receptacle which is, in particular, sleeve-shaped and is attached to the damper tube for receiving the additional piston in the rebound stage. The rebound stop arrangement has a spring element which is arranged at least partially within the rebound stop receptacle and is fastened to the additional piston.

The spring element is preferably arranged between the additional piston and the closure package and serves for additional damping of the movement of the piston rod in the rebound direction. In particular, the spring element is attached such that it can be moved in the axial direction relative to the piston rod and along the latter. Fastening of the spring element to the additional piston brings about guidance of the spring element in the axial direction and additional centring of the spring element on the piston rod.

The vibration damper is, for example, a monotube or a multitube vibration damper. For example, a multitube vibration damper for a vehicle comprises an outer tube and an inner tube which is arranged coaxially with respect to the former, a compensation space for receiving hydraulic fluid being configured between the outer tube and the inner tube, and a working piston which is connected to a piston rod and is arranged such that it can be moved to and from within the inner tube, the interior space of the inner tube being divided by way of the working piston into a first working space and a second working space. The compensation space is preferably filled at least partially, in particular at the upper end, with a gas. The outer tube preferably configures at least partially the housing of the vibration damper. The inner surface of the inner tube is preferably configured as a guide of the working piston. The working piston preferably has a valve device, by way of which the first and the second working space are connected to one another. The inner tube has, in particular, at least one passage opening which connects the first, piston rod-side working space to the annular space fluidically, the passage opening being configured in the first working space. In the case of a monotube vibration damper, no outer tube is preferably provided. The inner tube is called a damper tube and, as described previously in relation to the inner tube, receives the piston rod and the working piston.

In the case of a multitube vibration damper, the vibration damper has, in particular, a closure package which is configured and arranged to seal the interior space of the outer tube fluidically on the piston rod side. The piston rod-side end of the inner tube is preferably fastened to the closure package. Lying opposite the closure package, at the end which is remote from the piston rod, the interior space of the outer tube is preferably sealed fluidically by means of a bottom piece. A bottom valve is arranged, in particular, on the bottom piece, which bottom valve is attached, in particular, to that end of the inner tube which is remote from the piston rod. The second working space is preferably connected fluidically via the bottom valve to the compensation space. The bottom valve is preferably a check valve which can be flowed through in both directions or only one direction. For example, the bottom valve is configured as a check valve in the rebound direction, in the case of a piston movement in the direction out of the inner tube, and is configured as an identification generating valve in the compression direction, in the case of a piston movement into the inner tube.

In the case of a monotube vibration damper, the vibration damper has, in particular, a closure package which is configured and arranged to seal the interior space of the outer tube fluidically on the piston rod side. The piston rod-side end of the damper tube is preferably fastened to the closure package. Lying opposite the closure package, at the end which is remote from the piston rod, the interior space of the damper tube is preferably scaled fluidically by means of an axially movable sealing element. The sealing element preferably separates a gas space which adjoins it in the axial direction from the working space which is filled with hydraulic fluid. For example, the vibration damper does not have a bottom valve, but rather merely a bottom piece, the bottom piece forming a fluid-tight termination of the damper tube, and an adjusting valve which is external with respect to the damper tube being provided, which adjusting valve generates the damping action, for example, in the compression direction. It is likewise conceivable, in particular in the case of a monotube vibration damper, for the bottom piece to be replaced by a separating piston which separates the working space which is remote from the piston rod from a gas space.

In the following description, the term “vibration damper” is to be understood to mean both a multitube vibration damper and a monotube vibration damper, the damper tube being the inner tube of a multitube vibration damper. In the following text, a movement in the rebound direction is to be understood to mean a movement in the direction of the closure package into the piston rod-side region of the shock absorber, and a movement in the compression direction is to be understood to mean a movement in the direction of the bottom valve into that region of the shock absorber which is remote from the piston rod. The closure package is preferably arranged coaxially with respect to the piston rod and encloses it peripherally.

The vibration damper comprises a rebound stop arrangement which is configured for additional damping of the piston movement in the rebound stage. The rebound stop arrangement preferably comprises an additional piston, a rebound stop space and a rebound stop receptacle. The rebound stop space is preferably configured as an annular space within the first working space between the piston rod and the rebound stop receptacle. The rebound stop receptacle is, for example, of sleeve-shaped, in particular cylindrical configuration, and preferably has a smaller diameter than the inner tube. The rebound stop receptacle preferably bears in a fluid-tight manner against the inner wall of the damper tube. For example, the rebound stop receptacle is configured from a plastic or metal.

The additional piston is fastened, in particular, to the piston rod, preferably fastened in a positionally fixed manner. The additional piston is attached, for example, in front of the working piston in the rebound direction. The axial movement range of the working piston within the damper tube is preferably set in such a way that merely the additional piston can be moved into the rebound stop space, but not the working piston.

The additional piston comprises, for example, a multiplicity of annular regions or precisely one annular region which is/are arranged coaxially with respect to the piston rod and is/are fastened to the piston rod. The additional piston is preferably dimensioned in such a way that, in the case of a movement of the piston rod in the rebound direction, the additional piston closes off the rebound stop space fluidically at least partially, the additional piston preferably having a passage for allowing a flow to pass through the additional piston.

In accordance with a first embodiment, the additional piston has a connecting region for connecting the additional piston to the spring element, the spring element being connected to the connecting region of the additional piston fixedly, by means of a positively locking and/or non-positive connection, in particular a press fit. The additional piston preferably forms a receptacle for the spring element and therefore makes operationally reliable interaction of the spring element with the additional piston possible. The spring element serves for additional damping of the additional piston in the case of a movement of the additional piston in the rebound direction, with the result that contact of the additional piston with the end region of the damper, in particular the closure package, is prevented.

In accordance with a further embodiment, the connecting region has a profile. The profile is preferably configured on the outer and/or the inner periphery of the connecting region. The profile serves for more fixed connection, in particular a pressed connection, between the additional piston and the piston rod or between the connecting region of the additional piston and the spring element.

The profile preferably comprises a plurality of projections, on the outwardly and/or inwardly pointing peripheral surface, the projections being spaced apart from one another, for example, uniformly and extending, in particular, in the axial direction.

In accordance with a further embodiment, the spring element is a spiral spring, the internal diameter of the spiral spring being smaller than the external diameter of the connecting region of the additional piston. The spring element is preferably pressed or clamped onto the connecting region of the additional piston. In particular, at least one or two windings is/are fastened on the connecting region.

In accordance with a further embodiment, the spring element is attached by way of the end which lies opposite the additional piston to a receptacle which is attached such that it can be moved in the axial direction. For example, the closure package configures an axial stop for contact of the receptacle in the case of a movement of the spring element in the rebound direction. The spring element is preferably fastened to the receptacle in a positionally fixed manner. The receptacle is preferably arranged coaxially with respect to the piston rod and is attached, in particular, such that it can be moved in the axial direction along the piston rod relative to the latter.

In accordance with a further embodiment, the additional piston is configured in two parts and has a first piston region and a second piston region which are each fastened to the piston rod. A two-part configuration makes simple mounting of the additional piston on the piston rod possible.

The piston regions are, for example, of annular configuration and preferably bear against one another in a fluid-tight manner or are connected to one another.

In accordance with a further embodiment, the first and the second piston region are each attached to the piston rod by means of a positively locking, non-positive and/or integrally joined connection. The second piston region preferably adjoins the first piston region in the rebound direction, the spring element being fastened to the second piston region. The second piston region which has the connecting region is preferably attached to the piston rod by means of a pressed connection.

In accordance with a further embodiment, a region with a greater diameter relative to the connecting region which configures an axial support surface for the spring element adjoins the connecting region in the direction of the first piston region. The spring element is preferably supported on the support surface in the case of a movement of the additional piston in the rebound direction. The support surface preferably points in the rebound direction and is of planar, in particular flat, configuration.

In accordance with a further embodiment, the connecting region is configured to connect the second piston region to the piston rod. The connecting region preferably configures that end of the additional piston which points in the rebound direction. The connecting region is, in particular, of sleeve-shaped configuration and has, for example, an internal diameter which is smaller than the external diameter of the piston rod, with the result that a pressed connection is preferably configured between the piston rod and the additional piston. For example, on the inner peripheral surface, the connecting region has a profile with a plurality of projections and indentations, by way of which the adhesion of the connecting region to the piston rod is optimized.

In accordance with a further embodiment, the connecting region configures a snap-action connection with the piston rod. In accordance with a further embodiment, the connecting region has a plurality of at least partially radially inwardly oriented connecting projections which interact with cut-outs in the piston rod, with the result that a positively locking and/or non-positive connection, in particular a snap-action connection, is configured.

The connecting projections are oriented, for example, at an angle from approximately 10 to 60°, preferably from 20° to 40°, in particular of 30° with respect to the axial in the direction of the piston rod. The connecting region preferably has one, two, three, four or five or more connecting projections which are preferably attached such that they are spaced apart from one another uniformly over the circumference. In particular, the connecting projections point inwards in the radial direction. The piston rod has, for example, cut-outs, in particular an annular groove, into which the connecting projections engage. The connecting projections preferably configure a snap-action connection with the cut-outs in the piston rod.

In accordance with a further embodiment, the second piston region of the additional piston is configured from a plastic. The second piston region is preferably produced by means of a plastic injection moulding method. A piston region of this type can be produced particularly inexpensively. Preferably only the second piston region, arranged in the rebound direction, is configured from the plastic. Lower loads act on this region of the additional piston in the case of operation of the vibration damper, with the result that a configuration from a more inexpensive material, such as plastic, is possible.

In accordance with a further embodiment, a piston ring is arranged between the first and the second piston region. The piston ring is preferably configured as a C-ring with an opening. The piston ring is attached, in particular, such that it can be moved in the axial direction.

The second piston region has, in particular, a peripheral recess which is open in the direction of the first piston region. The piston ring is preferably arranged within the recess. The axial length of the piston ring is preferably smaller than the axial length of the recess, with the result that the piston ring is preferably attached such that it can be moved in the axial direction relative to the first and second piston region. In particular, the movement of the piston ring in the compression direction is limited by way of the first piston region, and the movement in the rebound direction is limited by way of the second piston region.

The respective external diameter of the first and the second piston region is preferably smaller than the internal diameter of the rebound stop receptacle, with the result that hydraulic fluid can flow between the first and the second piston region and the rebound stop receptacle. The piston ring preferably has an external diameter which corresponds to the internal diameter of the rebound stop receptacle and terminates in a fluid-tight manner with the latter. In particular, the piston ring has an internal diameter which is greater than the internal diameter of the recess in the second piston region, with the result that hydraulic fluid can flow between the piston ring and the first and/or second piston region. The additional piston preferably has a bypass channel which is configured between the internal diameter of the piston ring and the first and/or second piston region and extends, in particular, peripherally, preferably over the entire periphery. The bypass channel forms a fluidic connection between the rebound stop space and the first working space which is arranged in the compression direction of the additional piston.

The additional piston is preferably configured in such a way that the piston ring can be moved from an open position, in which the bypass channel is open, in particular completely, into a closed position, in which the flow diameter of the bypass channel is decreased relative to the open position, in particular is closed at least partially or completely by the piston ring. The bypass channel is preferably configured in the closed position exclusively by way of the opening of the piston ring which is configured as a C-ring.

FIG. 1 shows a vibration damper 10, the vibration damper 10 being, by way of example, a multitube vibration damper, by way of example a two-tube vibration damper. The vibration damper 10 has an outer tube 12 which configures an outer surface, in particular a housing, of the vibration damper 10. A damper tube 14 which is likewise called an inner tube 14 is arranged within the outer tube 12 coaxially with respect to the latter. The compensation space 16 which is preferably filled at least partially or completely with a hydraulic fluid is configured between the outer tube 12 and the inner tube 14. For example, the compensation space 16 is filled partially with a gas.

A working piston 18 which is connected to a piston rod 20 is arranged within the inner tube 14 in such a way that it can be moved within the inner tube 14, the inner tube preferably being configured as a guide of the working piston 18. The working piston 18 preferably has a valve device. For example, the valve device comprises a rebound stage valve, for damping of the piston movement in the rebound stage, and a compression stage valve for damping the piston movement in the compression stage. The valves are preferably each formed by way of a passage opening through the piston and a valve disc block. The working piston 18 divides the interior space of the inner tube 14 into a first working space 22 which is arranged on the piston rod side, and a second working space 24 which is arranged remote from the piston rod. The piston rod 20 can preferably be connected by way of its end which protrudes out of the damper tube 14 to the vehicle body.

The interior space of the outer tube 12 is sealed fluidically by means of a closure package 34. Lying opposite the closure package 34, at the end which is remote from the piston rod, the interior space of the outer tube 12 is sealed fluidically by means of a bottom piece 36. A bottom valve 38 which is attached, in particular, to that end of the inner tube 14 which is remote from the piston rod is arranged by way of example on the bottom piece 36. The bottom valve 38 is preferably a check valve which can be flowed through in both directions or only one direction. The second working space 24 is preferably connected fluidically via the bottom valve 38 to the compensation space 16. The piston rod-side end of the inner tube 14 is preferably fastened to the closure package 34.

The outer tube 12 is closed by way of example on the piston rod-side end region by a cap or a seal 26. The cap or seal 26 forms an end piece of the outer tube 12 and a termination with respect to the piston rod 20.

Furthermore, the vibration damper 10 comprises a rebound stop arrangement 28 for additional damping of the piston movement in the rebound stage. The rebound stop arrangement 28 comprises by way of example an additional piston 30, a rebound stop space 32 and a rebound stop receptacle 40. The additional piston 30 is attached to the piston rod 20, and is preferably fastened in a positionally fixed manner. The additional piston 30 is attached in front of the working piston 18 in the rebound direction Z, with the result that, in the case of a movement of the piston rod 20 in the rebound direction Z, that is to say in the direction out of the damper tube 14, the additional piston 30 reaches the rebound stop space 32 ahead of the working piston 18. The axial movement range of the working piston 18 within the damper tube 14 is preferably set in such a way that merely the additional piston 30 can be moved into the rebound stop space 32, but not the working piston 18. The rebound stop receptacle 40 is preferably attached to that end region of the damper tube 14 which points in the rebound direction, and is connected by way of example to the closure package 34.

The rebound stop space 32 is configured as an annular space between the piston rod 20 and the rebound stop receptacle 40. The rebound stop receptacle 40 is, for example, of sleeve-shaped, in particular cylindrical configuration and has a smaller diameter than the inner tube 14. The rebound stop receptacle 40 preferably bears against the inner wall of the inner tube 14 in a fluid-tight manner. For example, the rebound stop receptacle 40 is configured from a plastic or metal. By way of example, the rebound stop receptacle 40 has a constant internal diameter and/or external diameter. The damper tube 14 has, in particular, a constant internal diameter and/or external diameter.

The rebound stop arrangement 28 also comprises a spring element 44, in particular a spiral spring. The spring element 44 is arranged coaxially with respect to the piston rod 20 around the latter. The spring element 44 preferably has an internal diameter which is greater than or equal to the external diameter of the piston rod 20, and an external diameter which is smaller than or equal to the internal diameter of the inner tube 14, in particular of the rebound stop receptacle 40. The spring element 44 is preferably attached such that it can be moved in the axial direction along the piston rod 20 relative to the latter. The spring element 44 is supported by way of example with its one end on the additional piston 30 end and with its other end on a receptacle 42. The receptacle 42 is connected by way of example fixedly to the spring element 44, and is preferably arranged coaxially with respect to the piston rod 20. In particular, the receptacle 42 is attached such that it can be moved in the axial direction along the piston rod 20 relative to the latter. The closure package 34 forms by way of example an upper stop for the movement of the spring element 44 and the receptacle 42 in the rebound direction Z. In the case of a movement of the piston rod 20 in the rebound direction Z, the receptacle 42 preferably bears against the closure package 34.

Figure 2:
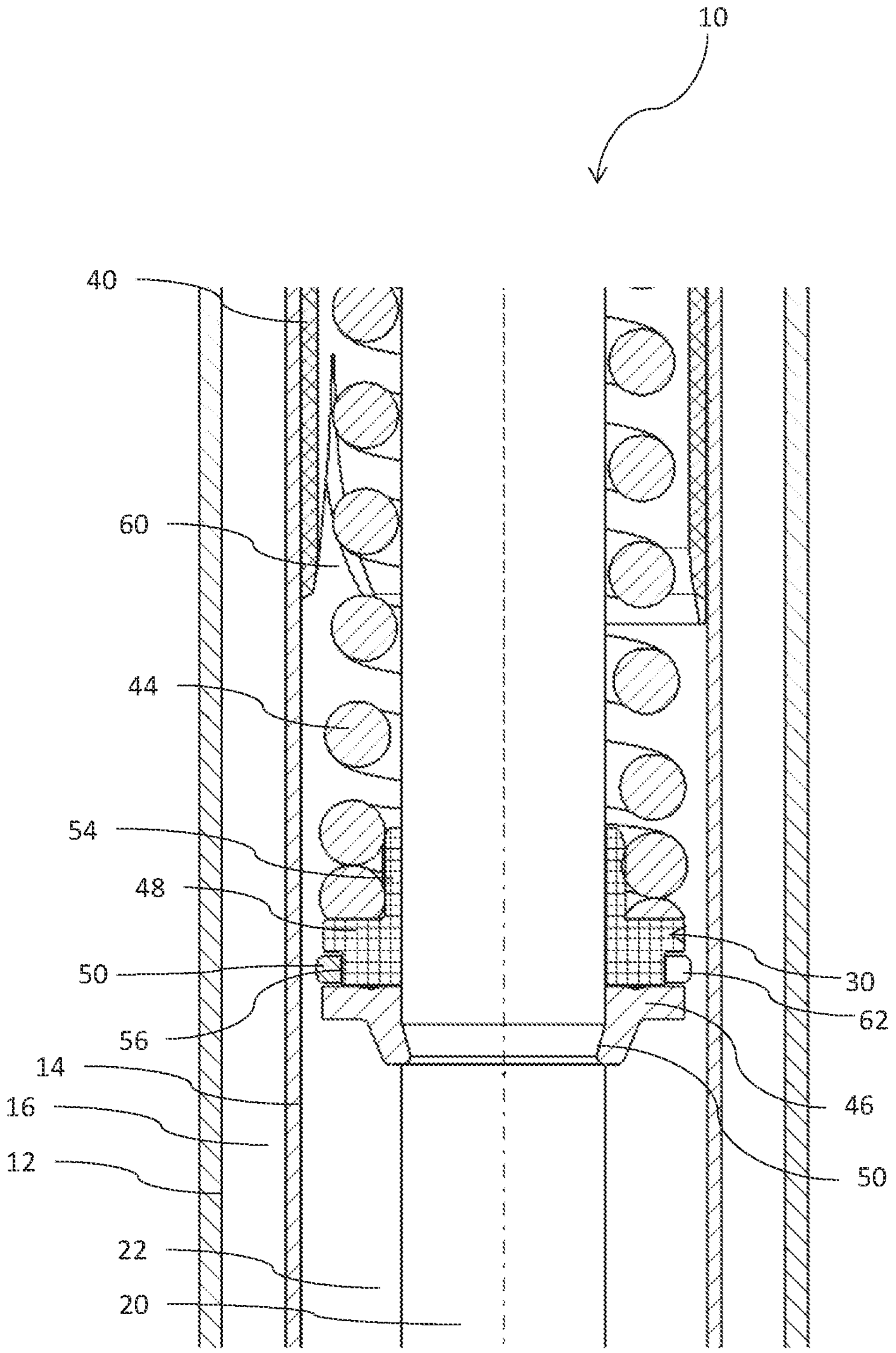
FIG. 2 shows a diagrammatic illustration of a part detail of a vibration damper in a longitudinal sectional view in accordance with a further exemplary embodiment.

FIG. 2 shows the additional piston 30 in a more detailed illustration. The additional piston 30 has a first, in particular annular, piston region 46 which is connected to the piston rod 20 in a fixed, in particular positively locking, integrally joined and/or non-positive manner. For example, the first piston region 46 is connected via a pressing or clamping connection to the piston rod 20. The piston rod 20 preferably has an annular groove 50 which configures a press fit with the (preferably lower) end region of the piston region 46. The first piston region 46 preferably configures that end of the additional piston 30 which points in the direction of the working piston 18. In the rebound direction Z, a second piston region 48 adjoins the first piston region 46. The piston regions 46, 48 are arranged coaxially with respect to the piston rod 20 and are preferably connected fixedly to the piston rod 20. The second piston region 48 bears by way of example with at least one surface against the first piston region 46. In particular, the first and the second piston region 46, 48 each have axial bearing surfaces, on which they bear against one another. The second piston region 48 is preferably connected to the piston rod 20 in a positively locking, integrally joined and/or non-positive manner. The second piston region 48 preferably has an internal diameter which is smaller than the external diameter of the piston rod, with the result that the second piston region 48 is pressed onto the piston rod 20. A piston ring 52 is arranged between the first and the second piston region 46, 48. The piston ring 52 is configured, for example, as a C-ring with an opening 62.

The first piston region 46 has by way of example a region with a substantially constant external diameter which projects in the radial direction beyond the second piston region 48 and preferably configures an axial support surface for the piston ring 52. The external diameter of the first and second piston region 46, 48 and the piston ring 52 is preferably smaller at every point than the internal diameter of the inner tube 14, with the result that a fluid passage is configured between the first and second piston region 46, 48 and the piston ring 52.

The second piston region 48 configures, in particular, that end of the additional piston 30 which points in the direction of the closure package 34. By way of example, at the closure package-side end, the second piston region 48 has a connecting region 54 for connecting the second piston region 48 to the spring element 44. The connecting region has, in particular, a smaller diameter than the remaining region of the second piston region 48. The connecting region 54 preferably has an external diameter which corresponds to the internal diameter of the spring element 44 or is greater than it. The spring element 44 is preferably connected to the connecting region 54 of the second piston region 48 via a positively locking and/or non-positive connection. In particular, the spring element 44 is pressed onto the connecting region 54 of the second piston region 48. The spring element 44 is preferably pressed onto the connecting region 54 via a pressing connection of the at least one, two or more lower spring windings. The connecting region 54 preferably has a substantially constant external diameter. In the direction of the first piston region 46, a region with a greater diameter relative to the connecting region which configures an axial support surface of the spring element 44 adjoins the connecting region 54. The second piston region 48 has, in particular, a peripheral recess 56 which is open in the direction of the first piston region 46. The piston ring 52 is preferably arranged within the recess 56. The axial length of the piston ring 52 is preferably smaller than the axial length of the recess 56, with the result that the piston ring is preferably attached such that it can be moved in the axial direction relative to the first and second piston region 46, 48. The movement of the piston ring 52 is preferably limited in the compression direction D by way of the first piston region 46, and is preferably limited in the rebound direction Z by way of the second piston region 48.

The additional piston 30 is preferably dimensioned in such a way that, in the case of a movement of the piston rod 20 in the rebound direction Z, the additional piston 30 closes off the rebound stop space 32 fluidically. By way of example, the damper tube 14 has a constant internal diameter, against which the rebound stop receptacle 40 bears in the piston rod-side end region. By way of example, the rebound stop receptacle 40 has an end region which is remote from the piston rod and a piston rod-side end region, the end region which is remote from the piston rod and faces the bottom valve 38 having a conically tapering inlet region, with the result that the external diameter of the rebound stop space 32 is increased from the internal diameter of the damper tube 14, preferably continuously, to the first internal diameter of the rebound stop receptacle 40. A region with a constant internal diameter preferably adjoins the conical inlet region of the rebound stop receptacle 40.

The rebound stop receptacle 40 preferably bears with the end side of the closure package-side end region against the closure package 34, and preferably configures a fluid-tight seal.

By way of example, the rebound stop receptacle 40 has, furthermore, a plurality of radial notches 60 which extend in the radial direction and preferably extend from the inlet region in the radial direction as far as from approximately 40% to 60% of the length of the rebound stop receptacle 40. The notches are preferably configured in such a way that their area decreases in the rebound direction. Within the context of this description, the internal diameter of the rebound stop receptacle 40 is to be understood to mean in each case the internal diameter of the rebound stop receptacle 40 without consideration of the notches 60.

The first and the second piston region 46, 48 are preferably configured in such a way that the external diameter is in each case smaller than the internal diameter of the rebound stop receptacle 40, with the result that hydraulic fluid can flow between the first and the second piston region 46, 48 and the rebound stop receptacle. The piston ring 52 preferably has an external diameter which corresponds to the internal diameter of the rebound stop receptacle 40 and terminates in a fluid-tight manner with the latter. In particular, the piston ring 52 has an internal diameter which is greater than the internal diameter of the recess 56 in the second piston region 48, with the result that hydraulic fluid can flow between the piston ring 52 and the first and/or second piston region 46, 48. The additional piston 30 preferably has a bypass channel 64 which is configured between the internal diameter of the piston ring 52 and the first and/or second piston region 46, 48, and extends, in particular, peripherally, preferably over the entire periphery. The bypass channel 64 forms a fluidic connection between the rebound stop space 32 and the first working space 22 which is arranged in the compression direction of the additional piston 30.

The additional piston 30 is preferably configured in such a way that the piston ring 52 can be moved from an open position, in which the bypass channel 64 is open, in particular completely, into a closed position, in which the flow diameter of the bypass channel 64 is reduced relative to the open position, in particular is closed at least partially or completely by the piston ring 52. The bypass channel 64 is preferably configured in the closed position exclusively by way of the openings 62 of the piston ring 52 which is configured as a C-ring.

Figure 3:
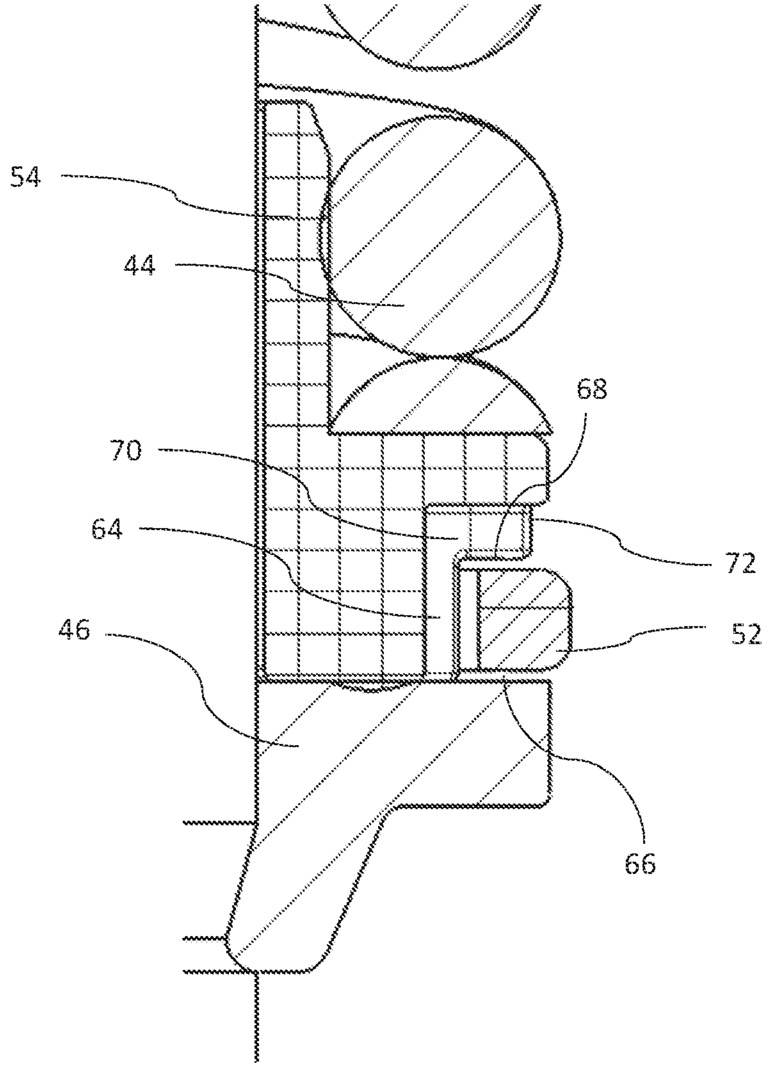
FIG. 3 shows a diagrammatic illustration of a part detail of a vibration damper in a longitudinal sectional view in accordance with a further exemplary embodiment.

FIG. 3 shows a detailed view of the additional piston 30 in a further embodiment. The first piston region 46 has an axial contact surface 66 for making contact with the piston ring 52 in the closed position. The contact surface 66 is preferably configured in such a way that it terminates in a fluid-tight manner with the piston ring 52, in particular over the entire periphery of the piston ring. For example, the contact surface 66 is configured as a flat, planar surface or has a profile which corresponds to a profile of the piston ring 52 in such a way that a fluid-tight connection can be configured.

The second piston region 48 has an axial contact surface 68 for making contact with the piston ring 52 in the open position. The contact surface 68 is preferably configured in such a way that, in the case of contact of the piston ring 52 with the contact surface 68, a hydraulic fluid can flow through the bypass channel 64, in particular between the contact surface 68 and the piston ring 52. The contact surface 68 preferably has a profile, in particular a plurality of indentations 70 and projections 72.

The additional piston 30 is preferably configured in such a way that, in the case of a movement of the additional piston in the rebound direction Z, the piston ring 52 bears in a fluid-tight manner against the first piston region 46, in particular the axial contact surface 66. In the case of a movement of the additional piston 30 within the rebound stop receptacle 40, the piston ring 52 additionally bears in a fluid-tight manner against the inner wall of the rebound stop receptacle 40, with the result that a hydraulic fluid can flow exclusively through the openings 62 in the piston ring 52 which is configured as a C-ring. The additional piston 30 is preferably configured in such a way that, in the case of a movement of the additional piston within the rebound stop receptacle 40 in the compression direction D, the piston ring 52 bears against the second piston region 48, in particular the axial contact surface 68, and hydraulic fluid can flow through the bypass channel 64 between the profile of the contact surface 68 and the piston ring 52.

Figure 4:
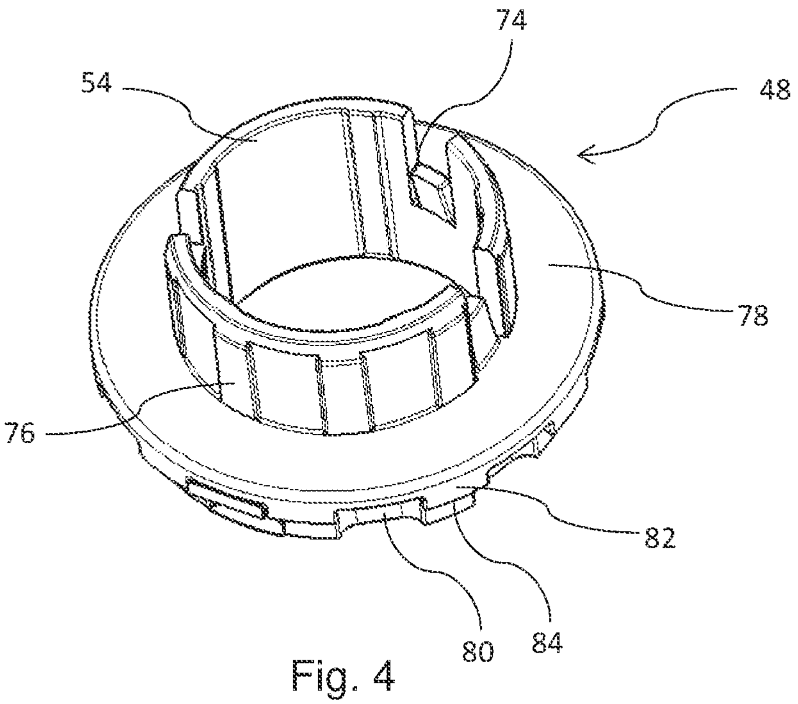
FIG. 4 shows a diagrammatic illustration of a region of an additional piston in a perspective view in accordance with a further exemplary embodiment.

FIG. 4 shows a perspective view of the second piston region 48. The connecting region 54 of the second piston region 48 is also configured by way of example for connecting the second piston region 48 to the piston rod 20. To this end, the connecting region 54 has, in particular, a plurality of at least partially radially inwardly oriented connecting projections 74 which are oriented, for example, at an angle from approximately 10 to 60°, preferably from 20 to 40°, in particular of 30° with respect to the axial in the direction of the piston rod 20. The piston rod 20 has, for example, cut-outs, in particular an annular groove, into which the connecting projections 74 engage. The connecting projections 74 preferably configure a snap-action connection with the cut-outs in the piston rod 20. The connecting region 54 has by way of example a profile, a plurality of projections 76 being provided on the outwardly pointing peripheral surface, which projections 76 are, for example, spaced apart uniformly from one another and extend, in particular, in the axial direction. Moreover, the second piston region 48 has an axial supporting surface 78 which points in the direction of the spring element 44 and against which the spring element 44 bears. The supporting surface 78 is by way of example of flat and planar configuration. The connecting region 54 is adjoined in the direction of the first piston region 46 by a first annular region with a first external diameter, and the latter is adjoined by a second annular region with a second external diameter which is smaller than the first external diameter. The first and the second annular region 82, 84 each have a plurality of radially inwardly pointing depressions 80 which are preferably arranged spaced apart from one another uniformly in the peripheral direction. The depressions configure, in particular, the profile of the axial contact surface 68, with the result that, in the case of a movement of the additional piston within the rebound stop receptacle 40 in the compression direction D, hydraulic fluid can flow through the depressions 80 of the contact surface 68 and the piston ring 52 through the bypass channel 64.

Figure 5:
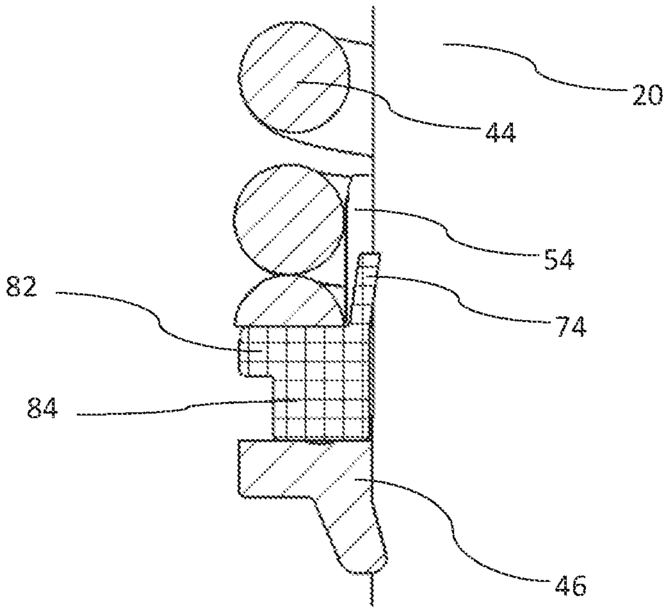
FIG. 5 shows a diagrammatic illustration of an additional piston with a spring element and the piston rod in a sectional view in accordance with a further exemplary embodiment.

FIG. 5 shows the additional piston 30 with the second piston region 48, described in relation to FIG. 5, in the connection which is snapped in on the piston rod 20.

LIST OF REFERENCE SIGNS

10 Vibration damper
12 Outer tube
14 Damper tube/inner tube
16 Compensation space
18 Working piston
20 Piston rod
22 First working space
24 Second working space
26 Seal
28 Rebound stop arrangement
30 Additional piston
32 Rebound stop space
34 Closure package
36 Bottom piece
38 Bottom valve
40 Rebound stop receptacle
42 Receptacle
44 Spring element
46 First piston region
48 Second piston region
50 Groove
52 Piston ring
54 Connecting region
56 Recess
60 Notches
62 Opening
64 Bypass channel
66 Axial stop surface of the first piston region
68 Axial stop surface of the second piston region
70 Indentation
72 Projection
74 Connecting projections
76 Projections of the connecting region
78 Supporting surface
80 Depressions
82 First region
84 Second region
Z Rebound direction
D Compression direction

What is claimed is:

1. A vibration damper for a vehicle, the vibration damper comprising:
- a damper tube which is filled with hydraulic fluid;
- a working piston which is connected to a piston rod and is arranged such that it can be moved back and forth within the damper tube, the interior space of the damper tube being divided by way of the working piston into a first working space and a second working space; and
- a rebound stop arrangement comprising:
  - an additional piston which is attached to the piston rod and encloses the piston rod concentrically;
  - a rebound stop receptacle which is sleeve-shaped and is attached to the damper tube for receiving the additional piston in the rebound stage; and
  - a spring element which is arranged at least partially within the rebound stop receptacle and is fastened to the additional piston;
  - wherein the spring element is attached by way of an end which lies opposite the additional piston to a receptacle which is attached to the piston rod such that it can be moved in the axial direction.

2. The vibration damper according to claim 1, the additional piston having a connecting region for connecting the additional piston to the spring element, and the spring element being connected to the connecting region of the additional piston fixedly, by one of a positively locking and a non-positive connection.

3. The vibration damper according to claim 2 wherein the connecting region has a profile.

4. The vibration damper according to claim 2 wherein the spring element comprises a spiral spring, an internal diameter of the spiral spring being smaller than an external diameter of the connecting region of the additional piston.

5. The vibration damper according to claim 2 wherein the additional piston is configured in two parts having a first piston region and a second piston region which are each fastened to the piston rod.

6. The vibration damper according to claim 5 wherein the first and the second piston region are each attached to the piston rod by means of one of a positively locking, non-positive and integrally joined connection.

7. The vibration damper according to claim 5, further comprising a region with a greater diameter relative to the connecting region which configures an axial support surface for the spring element adjoining the connecting region in the direction of the first piston region.

8. The vibration damper according to claim 5 wherein the connecting region connects the second piston region to the piston rod.

9. The vibration damper according to claim 2 wherein the connecting region comprises a snap-action connection with the piston rod.

10. The vibration damper according to claim 2 wherein the connecting region has a plurality of at least partially radially inwardly oriented connecting projections which interact with cut-outs in the piston rod, with the result that one of a positively locking and non-positive connection, is configured.

11. The vibration damper according to claim 5 wherein the second piston region of the additional piston is plastic.

12. The vibration damper according to claim 1 wherein a piston ring is arranged between the first and the second piston region.

13. The vibration damper according to claim 2 wherein the spring element is connected to the connecting region by a press fit.

14. The vibration damper according to claim 10 wherein the connection comprises a snap-action connection.

* * * * *